United States Patent [19]

Harren

[11] 4,414,924
[45] Nov. 15, 1983

[54] AIR JET UNIT

[76] Inventor: Hugh H. Harren, 1051 Site Dr. #81, Brea, Calif. 92621

[21] Appl. No.: 276,229

[22] Filed: Jun. 22, 1981

[51] Int. Cl.³ .......................................... F02M 25/02
[52] U.S. Cl. ................................ 123/25 E; 123/25 L; 123/573
[58] Field of Search ................. 123/25 R, 25 A, 25 E, 123/25 L, 198 A, 573

[56] References Cited

U.S. PATENT DOCUMENTS

| 1,551,511 | 8/1925 | Futcher | 123/25 E |
| 2,692,585 | 10/1954 | Dunnigan | 123/25 A |
| 3,173,408 | 3/1965 | Brenneman | 123/25 G |
| 3,557,763 | 1/1971 | Probst | 123/198 A |
| 3,716,040 | 2/1973 | Herpin | 123/522 |
| 3,749,376 | 7/1973 | Alm et al. | 123/25 E |
| 3,809,035 | 5/1974 | Winton | 123/573 |
| 3,856,901 | 12/1974 | Neumann | 123/25 R |
| 3,955,542 | 5/1976 | Skaggs | 123/25 L |
| 4,078,527 | 3/1978 | Yasuda | 123/25 B |
| 4,132,247 | 1/1979 | Lindberg | 123/25 E |

Primary Examiner—Ira S. Lazarus
Attorney, Agent, or Firm—Grover A. Frater

[57] ABSTRACT

An improved supplemental air flow and water injection system for internal combustion engines includes an air and water mixing chamber (24, 96) the contents of which are delivered to the intake fuel manifold of an internal combustion engine. Water is delivered from a storage reservoir (36) to one inlet opening (106) of the mixing chamber, and supplemental air is delivered to the chamber through a normally spring opened, pneumatic check valve (84, 110). The valve and the mixing chamber inlets and outlets are arranged physically so that at low negative pressures at the input manifold the air flow aspirates water into the mixing chamber (24, 96), but so that water is drawn into the chamber by a suction at higher negative pressures in the fuel inlet manifold.

9 Claims, 3 Drawing Figures

U.S. Patent
Nov. 15, 1983
4,414,924
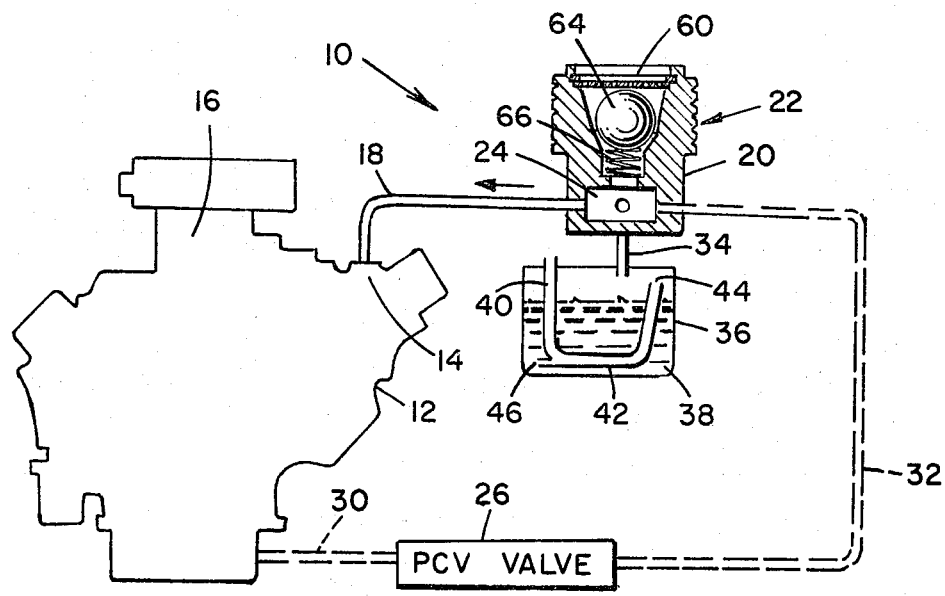
FIG. 1
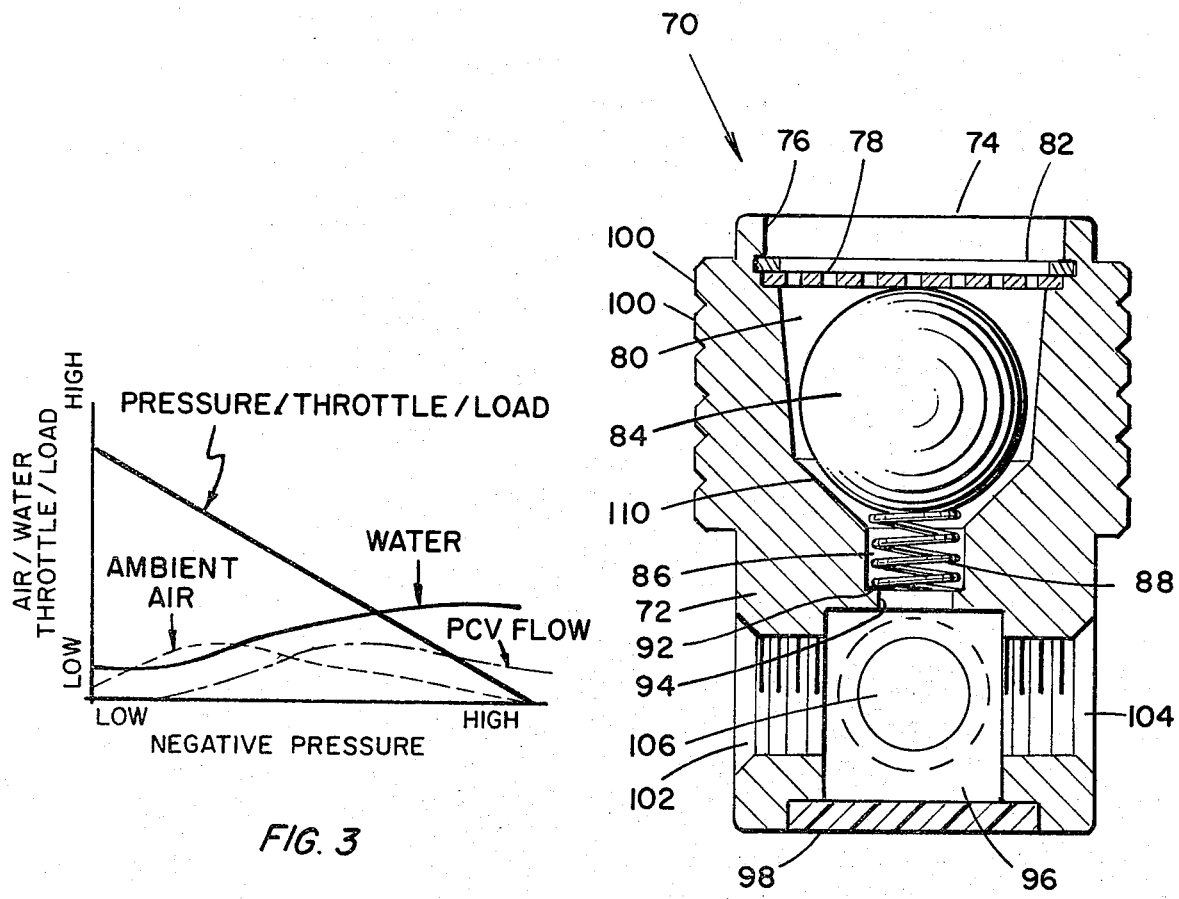
FIG. 3
FIG. 2

4,414,924

AIR JET UNIT

TECHNICAL FIELD

This invention relates to improved apparatus for adding water to the air fuel mixture of internal combustion engines.

BACKGROUND ART

It has long been known that fuel is used more efficiently by an internal combustion engine if mixed with very humid air. There was a period in the early history of motor car development when attempts were made to design "water injection" into fuel supply systems. While the use of water injection never enjoyed commercial acceptance, it was often used to enhance the performance of racing cars. The practice was to atomize water and to inject it into the air-fuel mixture. The "water-in-the-fuel" concept was not very salable. As fuel became more readily available, motor car makers directed their efforts elsewhere. Engine and fuel development advanced, but water injection did not.

Recently, interest in the practice was revivied by the development of a system which utilized a vacuum operated supplemental air supply device to mix air with small quantities of water to be drawn into the carburated fuel flow of gasoline engines. The supplemental air device was taken from the supplemental air inlet art. One example is shown in U.S. Albano-Harren Pat. No. 3,946,710. Such devices, and this example, comprises a normally spring opened valve for connection in a flow-path which extends from open air to the inlet manifold at a point just downstream from the carburetor. The manner of their operation is shown in a graph in the patent.

The combination of the air inlet device in parallel with a water source has been very successful for certain types of vehicle use in Europe and in Africa, particularly in more arid regions. The advantage offered is provided only under limited speed and load conditions. In practice, the system has not been as important in improving passenger car performance as it has been for vehicles which are operated at lower speed with periods of idling, as occurs in delivery services and some kinds of governmental service operations.

DISCLOSURE OF THE INVENTION

The object of the invention is to extend the advantage of supplemental air-water injection systems to a wider range of speed and load conditions, particularly to higher speeds and loads.

Much of what is accomplished by systems of this kind can be accomplished by computerized control of air and fuel ratios and firing time, and other factors. Those computerized systems require a variety of sensors, and their analysis and maintenance requires advanced instrumentation which requires advanced knowledge to use and calibrate and maintain. The skill and equipment to support those high technology systems is not available in many parts of the world. An object of this invention is to provide a system which requires little skill to service and maintain. A particular object is to provide apparatus which needs no field adjustment or treatment other than cleaning and the adding of water to a storage container.

The modification introduced by the invention appears in the supplemental air inlet valve structure, but the improvement is in system performance. The valve has been changed to the end that, instead of the air valve and water system being connected in parallel and each responsive to inlet manifold vacuum condition, the air valve serves as a water aspirator as well as a supplemental air source.

Simplicity is preserved and performance is still based on compromise, but the invention provides a far better compromise. The primary and visible difference in the invention is that air valve shut-off is less abrupt. Supplemental air flow begins at higher vacuum and continues even at zero vacuum condition. The system includes a storage tank for water, and the design of the supplemental air valve must anticipate that the supply might not always be replenished and might become depleted. At low and zero vacuum conditions, the supplemental air valve is to deliver very little air. The invention provides a system in which the water is aspirated in lesser degree as the vacuum value rises and is drawn by the vacuum rather than by aspiration. To do that, the valve is arranged so that inlet air volume decreases gradually as vacuum in the fuel inlet manifold is increased. Water flow results less and less from manifold suction and more and more from aspiration in the air and water supply line.

BRIEF DESCRIPTION OF THE DRAWINGS

In the drawings:

FIG. 1 is a schematic view of a supplemental air flow and water injection system applied to an internal combustion engine;

FIG. 2 is a view in central, vertical cross-section of a supplemental air inlet valve of preferred form; and FIG. 3 is a graph used to describe operation of the system depicted in FIG. 1.

DESCRIPTION OF THE PREFERRED EMBODIMENT

In FIG. 1 the system, including the engine, is usually designated 10. As shown, the system comprises an internal combustion, gasoline engine 12. The engine has conventional form and includes an input manifold 14 by which a mixture of fuel and air is delivered to the engine's cylinders.

The carburetor structure is indicated by the numeral 16, and a conduit 18 extends from the air inlet manifold 14 at a point just downstream from the carburetor 16. That manifold connects to one of three openings in the housing 20 of supplemental air valve 22. The lower portion of the housing is hollow to form a chamber 24 in which water droplets are mixed with ambient air or crankcase gasses that flow through chamber 24 through a pressure control valve 26. The pressure control valve is usually referred to as a PCV valve, or "smog" valve. The valve is connected to the crankcase 28 of engine 12 by a conduit 30, and the output of the valve is connected to chamber 24 of the supplemental air valve by a conduit 32.

Conduits 30 and 32 have been drawn in dashed lines to indicate that their inclusion is not mandatory for proper operation of the invention. In some countries of the world, and in some models of motor vehicles, a PCV valve is included in a flow line that extends from the crankcase to the inlet air manifold. In other countries, and in other vehicles, the valve and the flow lines 30 and 32 are omitted. If omitted, the opening at which conduit 30 enters the engine is closed and the opening by which conduit 32 connects to the supplemental air valve 22 is also closed.

The third conduit that opens to chamber 24 is identified by the reference numeral 34, and it connects to the ullage space of a water reservoir 36. During operation of the invention, water droplets are drawn into the conduit 32 from the reservoir 36 and are conducted to the chamber 34. That can be done by opening the top of the water reservoir 36 to atmosphere and by extending the conduit 34 down into the body of water 38. However, in this preferred embodiment, the reservoir 36 is closed except that it has an inlet tube 40 which opens to atmospheric air at a point above the level of the liquid in the reservoir. That conduit conducts air down toward the bottom of the reservoir where it has an opening communicating with the body of water 38. The remainder 42 of tube 40 extends through the body of water and, then, up into the ullage space to a position near the inlet end of the conduit 34.

Because the chamber 24 is connected to the ullage space 44 of the reservoir 36, a reduction in pressure in chamber 34 results in a reduction of pressure in the ullage space 44. As a consequence, air is drawn into the tube 40 and that air must flow through the portion 42 of the tube which is downstream from the tube opening 46. At that point, the air forms bubbles in the liquid in the line. Water and bubbles are drawn through the portion 42 of the tube, and emerge in the ullage space opposite the opening of the conduit 34 where they are drawn into conduit 34. Thereafter, water droplets, and some air, are drawn through the conduit 34 into the mixing chamber 34 of valve 22.

The valve is formed by an air flow passage which extends from the upper face of the tube through a filter screen 60 into a ball chamber 62, past a ball 64 which serves as a movable valve element in conjunction with a seat formed by a reduction in diameter of the flow path wall. The ball is normally held away from the seat by a compression spring 66. A shoulder is formed in the flowpath near the point in which it opens into chamber 24, and the spring 66 is seated on that shoulder and extends up into the ball chamber 62 where it engages and holds the ball 64 against the filter screen.

The valve is normally open because the spring 66 holds the ball away from its seat. When the pressure in chamber 24 is reduced, air flows into the chamber past the ball 64. The friction which characterizes the flow of air past the ball exerts a force in a direction to close the valve by drawing the ball down against the bias of spring 66 into engagement with an annular portion of the lower ball chamber wall. That annular portion serves as the seat of the valve.

It is difficult to graph the operation of the system because ambient air flow, water flow, and flow through the PCV valve are a function of negative pressure in the inlet manifold of the invention; but that pressure is a complex function of throttle position and load. For the purpose of the graph in FIG. 3, that function has been indicated by a straight line marked PRESSURE/-THROTTLE/LOAD. That line has negative slope to show that it is inversely related to negative pressure at the input manifold. As a consequence, the graph of the variation with negative pressure of ambient air and water flow and PCV valve flow are only approximate. If the PCV valve is omitted, then the ambient air flow is increased a little.

One important feature illustrated by the graph is that ambient air in substantial quantities flows at very low negative pressure. The supplemental air valve structure is arranged so that that ambient air flow at low negative pressure proceeds at high velocity and is effective in aspirating water into the mixing chamber 24 and through the conduit 18 to the inlet manifold even when the pressure in the inlet manifold is insufficient to draw water from the reservoir 36 into the chamber 24. At higher negative pressure, the ball begins to approach its seat, and supplemental air flow is diminished, as it should be, for proper engine operation. However, at high negative pressure, there is sufficient suction in chamber 24 and in conduit 34, and in ullage space 44, to force a flow of water droplets up through the section 42 of tube 40. An increased quantity of water is drawn into chamber 24 and is moved through the conduit 18 into the fuel input manifold.

The ambient air and water flow variations, and the combination of ambient air and PCV valve flow, approach an ideal condition much more closely than was possible in the prior art systems. That is accomplished in the invention by the use of an air inlet valve that provides a special balance between the volume and the velocity of supplemental air that is introduced into the valve through the supplemental system.

The valve shown in FIG. 2 has the preferred form, but other valve configurations are possible. One of the objectives of the invention is to provide a system that requires no adjustment, and is easy to clean. The valve shown meets those requirements and, in some measure, is self cleaning. The valve of FIG. 2 is symmetrical about the vertical center line 62 except in the matter of its inlet openings. The valve is generally designated 70. The valve housing 72 is cylindrical about the center line 62. A longitudinal, axial bore extends entirely through the housing. Beginning at the air inlet end 74 of the housing, the bore has relatively large diameter in a section 76 which extends a short way into the housing and which is undercut to greater diameter at the end of that section 76 to receive the margins of a filter disc 78. The disc is a flat metallic piece which is foraminated to admit air through the filter into the ball chamber 80 below. The numeral 82 identifies a C-shaped spring which is expanded into the undercut and serves to retain the filter disc 78 in place.

The walls of the ball chamber are tapered to slightly smaller diameter in the direction of air flow. The height of that chamber is approximately the same as the diameter of the ball 84. At its lower end, the taper of the ball chamber wall increases so that the diameter of the bore at the lower end of the ball chamber has a diameter substantially less than that of the ball itself. In this embodiment, the bore continues with uniform diameter over a section identified with the reference numeral 86. The wall at that section 86 forms a chamber for the biasing spring 88. That spring is a coiled compression spring, and its lower end rests upon a shoulder 90 which is formed by a reduction of the bore diameter at a section 94 just below the spring chamber. The section 94 is relatively short, and it opens to the mixing chamber 96. The mixing chamber extends almost to the lower face of the housing. At the face, the bore diameter is increased, and it is closed by a closure disc 98 which is press fitted into the housing.

The external surface of the housing is formed with radial fins some of which are numbered 100 for identification. The purpose of the fins is to facilitate cooling of the housing.

Thus far described, the valve 70 is entirely symmetrical about the line 62. There are three threaded openings which communicate from the exterior of the housing to the mixing chamber 96. They are visible in FIG. 2 where they are identified by the reference numerals 102, 104 and 106. They are all internally threaded, and they have the same diameter. Openings 102 and 104 are formed on a common axis which is perpendicular to the axis 62 and intersects it. The axis of opening 106 is perpendicular to the axis 62 and the common axes of openings 102 and 104 and it intersects with those several axes.

In the preferred system, opening 106, the one that is perpendicular to those on a common axis, is used as the water inlet. One of openings 102 and 104 is connected to the fuel inlet manifold of the engine, and the other, unless blocked, is connected to the PCV valve flow line.

The desired valve action can be achieved in a number of valve configurations. The structure shown in FIG. 2 is a modification of what has proven to be a very reliable ball check pneumatic valve. What is different is the shape of the ball chamber 80. It is arranged so that the area of the flow passage at the equator of the ball (the midplane perpendicular to the direction of opening and closing movement) decreases gradually as the ball is drawn toward its seat. In addition, the area within the ball chamber below the equator of the ball has been reduced somewhat. The elements of FIG. 2 have been drawn slightly out of proportion to aid in intuitive understanding of air flow past the ball and valve operation generally. In the preferred form, in which the ball has a diameter of 19.05 mm, the diameter of the spring chamber 86 is 7.67 mm. The depth of the ball chamber, measured from the lower face of the filter disc 78 to the level of the junction between the tapered wall 110 of the ball chamber and the straight wall of the spring chamber, is 20.07 mm. That wall 110 is tapered at an angle of 45 degrees from the center line 62. The remaining upper portion of the ball chamber wall is tapered at 5 degrees. It has a diameter of 19.81 mm at its junction with the wall 110. At its upper end, the ball chamber has a diameter of 20.65 mm. The rate of spring 88 is 1.54 cm per kilogram (0.06 inches per 3.5 oz.) in the preferred form.

While those dimensions define a less than optimum check valve, they do define what tests have shown to be a fine supplemental air valve for internal combustion engines. More is required, however, if the unit is to serve as an aspirator at low negative pressures. It is usual, in designing aspirators, to arrange so that the flow of the aspirating fluid, the flow of the fluid being aspirated, and the output flow all occur along the same line. That can be done in the invention, of course, but it is not done in the preferred embodiment. In this case, the aspirating effect to bring water into the system is desired only at low negative pressures. At higher negative pressures, it is suction, rather than aspiration, that is desired. Less supplemental air is required at high negative pressure. In fact, the supplemental air valve is designed to shut off at high negative pressure values.

As shown both in FIG. 1 and in FIG. 2, there is a mixing, or aspirating, chamber within the valve housing downstream from the supplemental air valve. Here, air, water and PCV valve flow, if any, join at right angles and leave the chamber at right angles to the supplemental air flow and to the water inflow. It is not at all obvious why, but this physical arrangement works very well.

Although I have shown and described certain specific embodiments of my invention, I am fully aware that many modifications thereof are possible. My invention, therefore, is not to be restricted except insofar as is necessitated by the prior art.

I claim:

1. For a supplemental air and water injection system for internal combustion engines:
   an air-water mixing chamber having water and air inlets and a water and air mixture outlet;
   water conducting means for conducting water to said water inlet of the mixing chamber; and
   a supplemental air flow valve in the form of a spring biased, normally open valve in which flow volume diminishes gradually as the valve is closed in response to increasing downstream negative pressure;
   the air inlet, the water inlet, and the water and air mixture outlet of said mixing chamber being arranged at angles to one another such that water appearing at said water inlet is aspirated from said water inlet at low negative outlet pressure by air flow from said air inlet and is sucked from said water inlet by negative pressure at said outlet when the negative pressure at said outlet is high.

2. The invention defined in claim 1 in which said air inlet and said water inlet are at right angles to one another and to said outlet.

3. The invention defined in claim 1 in which said air valve comprises a spring opened ball valve, the ball being contained in a ball chamber whose diameter diminishes in the region of its equator in the direction toward the valve seat.

4. The invention defined in claim 2 which further comprises a closed water storage container and means for conducting a combination of water and air from the ullage space in said container to said mixing chamber in response to genative pressure in said mixing chamber.

5. The invention defined in claim 3 in which said spring opened valve is contained in a valve housing, the ball chamber being formed within said housing and opening to an air outlet at one end of said ball chamber;
   the chamber being symmetrical about an axis common to the chamber and said air outlet and comprising a downstream side wall adjacent to said air outlet and an upstream side wall adjacent to and upstream from the downstream side wall, both the upstream and downstream side walls being tapered to smaller diameter in the direction of the air outlet, the rate of taper in the upstream wall exceeding that of the downstream wall by several times.

6. The invention defined in claim 5 in which the ball of the valve has a diameter at its equator only slightly larger than the diameter of the ball chamber at the juncture of the upstream and downstream side walls.

7. The invention defined in claim 6 in which the upstream and downstream side walls are tapered at angles of approximately 5 degrees and 45 degrees, respectively.

8. The invention defined in claim 7 in which the diameter of the ball is approximately 19.05 mm at the equator and the diameter of the upstream and downstream side walls at their junction is approximately 19.81 mm.

9. The invention defined in claim 8 which further comprises means in the form of a spring the spring rate of which is 1.54 cm per kilogram for holding the ball valve normally open.

* * * * *